Dec. 30, 1969   D. T. AYERS, JR   3,486,800
SKID CONTROL SYSTEM INCLUDING HYDRAULIC MODULATING VALVE
Filed March 21, 1968   2 Sheets-Sheet 2
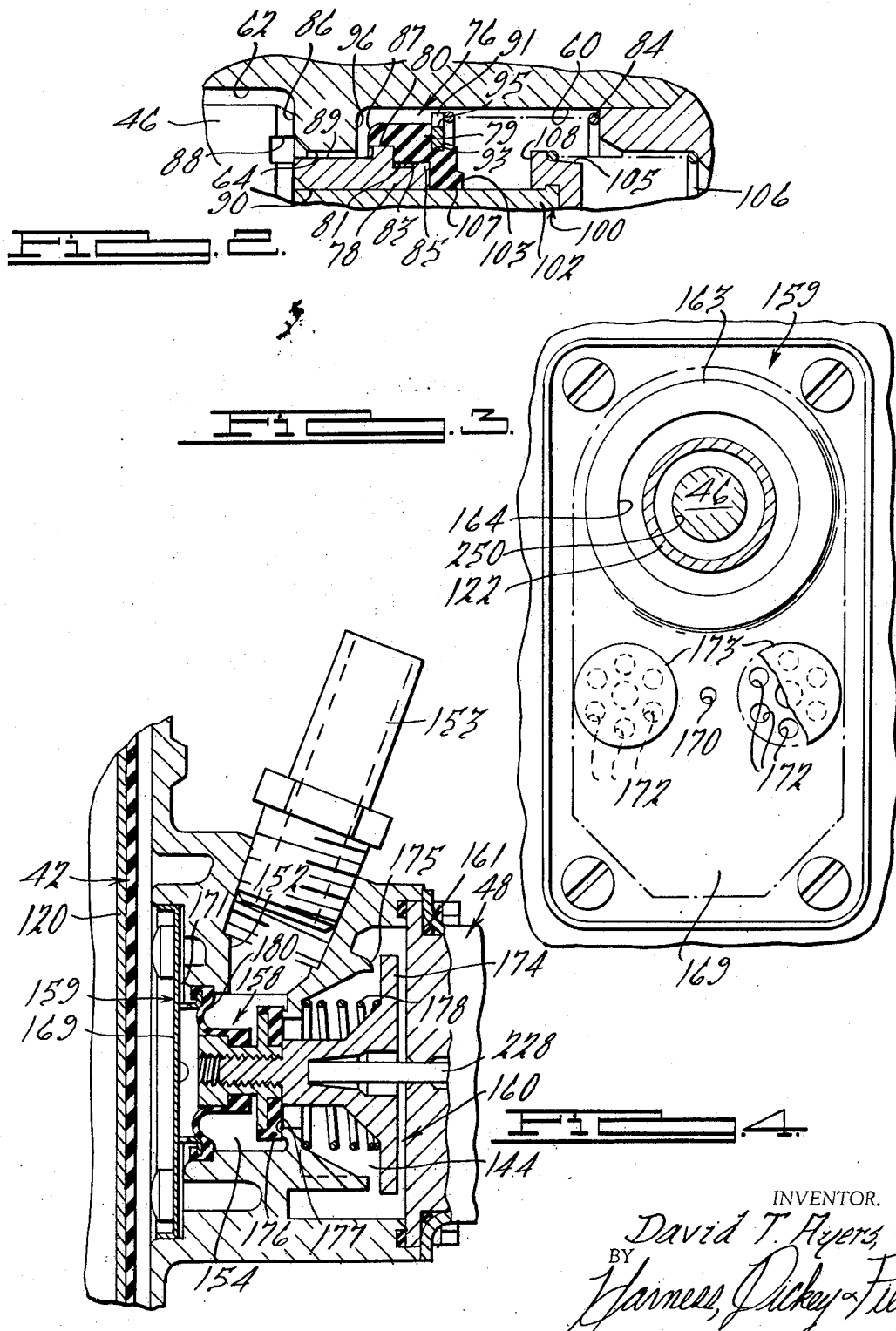
INVENTOR.
David T. Ayers, Jr.
BY
Harness, Dickey & Pierce
ATTORNEYS.

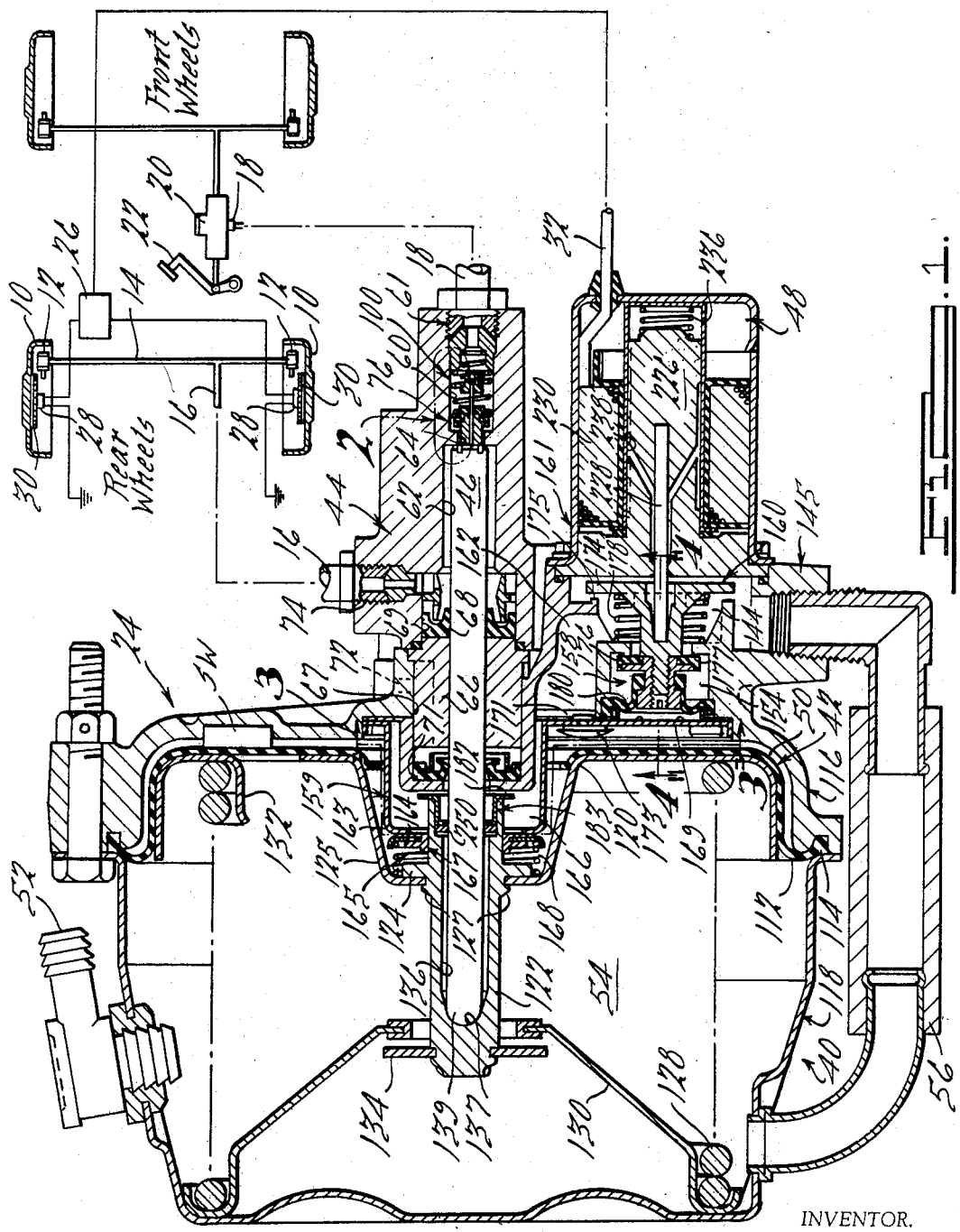

United States Patent Office 3,486,800
Patented Dec. 30, 1969

3,486,800
SKID CONTROL SYSTEM INCLUDING HYDRAULIC MODULATING VALVE
David T. Ayers, Jr., Birmingham, Mich., assignor to Kelsey-Hayes Company, Romulus, Mich., a corporation of Delaware
Filed Mar. 21, 1968, Ser. No. 715,023
Int. Cl. B60t 8/06; F15b 13/04
U.S. Cl. 303—21                                15 Claims

ABSTRACT OF THE DISCLOSURE

A skid control system for fluid actuated brakes of a wheeled vehicle including a novel modulating valve for modulating the fluid pressure to the fluid actuated brakes, with said modulating valve including a pneumatically operated diaphragm assembly with the diaphragm assembly being pivotally supported at one end upon a relief piston, and including a throttling valve located concentrically with the relief piston.

---

The present invention relates to skid control systems, and more particularly relates to a skid control system including a novel control or modulating valve.

It is an object of the present invention to provide a novel skid control system for controlling the brakes of the wheels of a wheeled vehicle.

It is another object of the present invention to provide a novel modulating or control valve for use in a skid control system for controlling the brakes of the wheels of a wheeled vehicle.

It is another object of the present invention to provide a novel skid control system for fluid actuated brakes for wheels of a wheeled vehicle including a novel modulating or control valve for modulating or controlling the pressure to the brakes in response to an electrical signal indicating the occurrence or the imminence of a wheel skid condition.

Other objects, features and advantages of the present invention will become apparent from the subsequent description and the appended claims, taken in conjunction with the accompanying drawings, in which:

FIGURE 1 is a partially schematic diagram of a skid control system embodying features of the present invention with the modulating valve shown in elevation and in section;

FIGURE 2 is a fragmentary, enlarged sectional view of the check and bleed valve indicated by the dot-dash line in FIGURE 1;

FIGURE 3 is a blown up view with some parts broken away of a pneumatic check valve of the modulating valve as viewed in the direction of the arows 3—3; and FIGURE 4 is a blown up, fragmentary sectional view of the valve of FIGURE 1 taken generally along the line 4—4.

The skid control system of the present invention can be utilized and will be described specifically for use with an automative vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automative vehicle. The present invention is a modification of the modulating valve shown and described in the copending application of Peter Every and William Stelzer, Ser. No. 642,861, filed June 1, 1967 for Skid Control System Including Hydraulic Modulating Valve and that disclosure is incorporated herein by reference and, for purposes of simplicity, so much of that disclosure has been included here as is necessary to understand the present invention.

Looking now to FIGURE 1, the schematic diagram generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the operation of the brakes. The brakes associated with the brake drum 10 can be of a conventional construction and hence the details thereof have been omitted for the purposes of simplicity.

The modulating valve 24 in the present system is actuated in accordance with an electrical signal obtained from an electrical control module 26. The control module 26 receives information from sensors 28 associated with each of the brake drums 10 by means of exciter rings 30. The exciter rings 30 and sensors 28 can be of constructions known in the art and since the specific details thereof do not constitute a part of the present invention they have been omitted for the purpose of simplicity. The exciter rings 30 can be of a toothed construction and the sensors 28 can be of a permanent magnet or electromagnet construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid condition existing or to be occurring at the wheels associated with drums 10. The output or control signal will be transmitted by means of conductor 32 to the modulating valve 24. In the system of the present invention the control module 26 can provide merely an "on" or "off" signal and modulation of the fluid pressure to the brake cylinders 12 will be provided by the modulating valve 24. In some skid control systems the fluid pressure to the brakes is varied in response to an electrical output signal of varying magnitude. In the present invention, the fluid pressure is varied by the valve 24, in response to a signal of generally constant amplitude which permits the remainder of the system to be simplified.

The skid control system of the present invention for fluid actuated brakes for braking of the vehicle varies or controls the fluid pressure to the brake system. Under certain road conditions application of maximum brake pressure (or less) will result in skidding and a locked-wheel and/or skid condition. If the vehicle wheels are locked or are skidding excessively, the coefficient of friction between the surface of the road and the vehicle tire decrease and the effectiveness of the brake system in stopping the vehicle is substantially reduced. It has been theorized that the maximum coefficient of the friction and hence the most effective braking can be realized when the wheel slip is between 10 and 20%. Wheel slip has been defined as the ratio of the difference between car velocity (Vc) and braked wheel velocity (Vw) to car velocity (Vc) or (Vc–Vw)/Vc. A brake pressure curve for braking the vehicle at the desired slip and hence utilizing the maximum coefficient of friction can be determined (see copending application, supra). Brake pressures slightly above that curve will result in excessive pressure and wheel skid. The maximum pressure to provide desired wheel slip is less than the maximum obtainable pressure of the system and hence relief from the maximum brake pressure is desirable in order to stop the vehicle in the shortest distance. It is a function of the system of the present invention to provide operational characteristics which will simulate or closely simulate the ideal brake pressure curve.

In the system of the present invention, the modulating valve 24 in response to the output signals from the module 26 will provide for a modulated brake pressure which approximates the ideal brake pressure curve and hence provides characteristics for stopping the vehicle in the shortest possible distance.

In general the modulating valve 24 has a vacuum chamber housing 40 divided by a diaphragm assembly 42. A hydraulic cylinder housing 44 is mounted to the housing of the vacuum chamber housing 40 and has slidably located therein a hydraulic piston 46 which is mechanically associated to the diaphragm assembly 42 in a manner to be described. Mounted to one side of the hydraulic cylinder housing 44 is solenoid assembly 48 whose plunger seats itself over an atmospheric air inlet port to shut off the introduction of atmospheric air pressure into one side 50 of the vacuum chamber housing 40 when no skid control is indicated. The vacuum housing chamber 40 is held at vacuum through engine (not shown) vacuum via engine vacuum line 52 which communicates to the other side 54 of the vacuum chamber 40. A conduit assembly 56 and a normally opened vacuum port communicate the opposite side 50 to vacuum. When the control module 26 provides an output signal indicating a skid condition energization of the solenoid 48 occurs and the solenoid plunger is unseated from the atmospheric air inlet port allowing atmospheric air pressure to enter the opposite side 50 of the chamber housing 40. At the same time the vacuum port is closed by actuation of solenoid 48. With the differential pressure created the diaphragm assembly 42 is moved permitting the hydraulic piston 46 to move. As the piston 46 moves the available volume within the hydraulic cylinder housing 44 increases and at the same time a check valve 76 is closed cutting off any further substantial application of master cylinder pressure to the brakes of the wheels being skid controlled. The brake cylinder pressure which has already been built up will be relieved by flowing into the increased volume created in the hydraulic cylinder housing 44 by the movement therefrom of the hydraulic piston 46. With relief of brake cylinder pressure the associated wheel can spin up or increase in speed and the control module 26 will de-energize the solenoid 48 allowing the plunger of solenoid 48 to return with the atmospheric air inlet port being closed again and the vacuum port to the one side 50 being opened. In this condition the piston 46 and diaphragm assembly 42 return towards their original positions. At the original position of piston 46, the check valve 76 is unseated permitting master cylinder pressure to be applied through the valve 24 directly to the brake cylinders 12.

The hydraulic cylinder housing 44 is connected to a generally cup shaped chamber section 116 of the vacuum chamber housing 40 and has a first cylinder 60 which has one end connected to the hydraulic line 18 from the master cylinder 20 via a conventional fitting assembly 61. The cylinder 60 houses the check valve 76 and a bleeder valve 100 to be described. (The check valve 76 and bleeder valve 100 are described in detail in the copending patent application of William Stelzer, Ser. No. 702,095 filed Jan. 31, 1968; the details of that application are incorporated herein by reference.) The first cylinder 60 is connected to a relief cylinder 62 in which is located the hydraulic piston 46. A bore 64 interconnects the cylinders 60 and 62 and is of a reduced diameter relative thereto. The relief cylinder 62 is connected in line with an enlarged bore 67 in the chamber section 116. A support bearing 66 is located in the bore 67 and extends partially into an enlarged portion 69 of the cylinder 62 and slidably supports the piston 46. The piston 46 extends into the relief cylinders 62 in radially clearance relation and is also extensible into the vacuum chamber housing 40. A hydraulic seal 68 is located adjacent bearing 66 at the end of an enlarged portion 69 of cylinder 62 and provides a fluid seal against the surface of the piston 46. At the inner end of the enlarged bore 67 is located a vacuum seal assembly 71 which prevents loss of vacuum from the one side 50 of the vacuum chamber housing 40. The enlarged bore 6 is vented to atmosphere via a port 72 and the atmospheric pressure is used to aid the seal 71 in its sealing function.

The fluid line 16 is connected in fluid communication with the enlarged portion 69 of relief cylinder 62 via hydraulic fitting assembly 74 and hence fluid to the brake cylinders 12 must pass from line 18 through cylinder 60, bore 64 and relief cylinder 62 to line 16.

The check valve assembly 76 is located in the cylinder 60 and bore 64 and includes a valve body 78 which has an enlarged head portion 80 located in the cylinder 60. The valve body 78 has an annular, flexible seal 79 having a radially inwardly extending ring portion 81 which fits in a groove 83 located between head portion 80 and a reduced diameter flange 85. The flexible seal 79 generally is cup-shaped and overengages the head portion 80, groove 83, flange 85 and the rearward surface of valve body 78. The forward end of the seal 79 has an annular sealing lip 87 which extends axially beyond the forward end of head portion 80 and provides a sealing action in a manner to be described. The valve body 78 has a forwardly extending portion 89 which is of reduced diameter and which extends through bore 64 and provides a substantial radial clearance therewith to facilitate the flow of fluid therebetween. An annular ring 91 is supported in an annular groove 93 at the rearward end of seal 79 and is in close clearance relation with the walls of bore 60. The outer periphery of ring 91 is notched (see FIGURE 2) as at 95 to provide for unrestricted fluid flow between opposite sides of ring 91. Thus the ring radially pilots the valve body 78 and seal 79 permitting for an enlarged passage between the forward portion 89 of valve body 78 and bore 64. A spring member 84 is in engagement with the ring 91 and is biased to continuously urge the valve body 78 to a closed position. The hydraulic piston 46 is normally held in engagement against the annular shoulder 86 which is defined by the juncture of bore 64 and the relief cylinder 62. The end of the piston 46 has a pair of radially separated straight cross slots 88 (defining chords in the circular end of piston 46) which are in communication with the substantial clearance between bore 64 and forward portion 89 of the valve body 78. In a normally deactuated condition of the modulating valve 24 with the piston 46 located against the shoulder 86, the spring 84 urges the valve body 78 toward the cylinder 62 with the forward portion 89 engaging the end of the piston 46. In this condition the sealing lip 87 is located in clearance relation with walls of the cylinder 60 and hence communicates the cylinder 60 with the cylinder 62 via the clearance past bore 64 and cross slots 88. In this condition normal braking can be effectuated since fluid can freely pass from line 18 from the master cylinder 20 to line 16 to the wheel brake cylinders 12 via the modulating valve 24. Upon the occurrence of a skid condition whereby a skid control output signal is derived from the control module 26, the piston 46 is moved outwardly from the relief cylinder 62 and the spring 84 moves the valve body 78 in the same direction moving the sealing lip 87 into engagement with a shoulder 96 of the cylinder 60 to substantially seal cylinder 60 from cylinder 62. At this point fluid from the master cylinder 20 to conduit 18 is generally cut off.

As previously noted a bleed valve assembly 100 is located in the cylinder 60 and is also actuated by the piston 46 and hence upon sufficient movement of piston 46 out of cylinder 62 the bleed valve assembly 100 will also be closed.

The bleed valve assembly 100 includes an elongated stem 102 which extends through a bore 90 in valve body 78 and is in closed clearance therewith. The terminating end of the elongated stem 102 is located against the end of the piston 46 when the valve assembly 100 is in its normally deactuated position as shown in FIGURE 4. The opposite end of the elongated stem 102 is connected to a cap 105 which is engaged by a spring 106 which urges the cap 105 and stem 102 in a direction towards the cylinder 62 to a closed position. The elongated stem 102 has an annular sealing surface 108 which, with the elongated stem 102 in its end actuated position, will engage an annular, rearward facing sealing boss 103 in the seal 79 to close the clearance passage between the bore 90 and stem 102. In its actuated, closed position the stem 102 extends substantially beyond the end of stem or forward portion 89 of the valve body 78 such that on the return of piston 46 the bleed valve assembly 100 will be opened before the check valve assembly 76; this serves a purpose to be later described. Since actuation of the piston 46 is rapid, closing of the main passage through the check valve assembly 76 and the closing of the secondary restricted passage through the bleed valve assembly 100 occur in relatively rapid succession. The seal 79 has a radially inner surface 107 which engages the stem 102; the surface 107 is scalloped to permit flow of fluid for the bleed valve function. Note that the seal 79 provides a sealing function for the check valve 76 and also for the bleed valve 100.

As the hydraulic piston 46 is withdrawn from the cylinder 62 its available volume is increased whereby the fluid pressure in the cylinder 62 and in the line 16 and hence in the wheel brake cylinder 12 will be relieved. Relief of the fluid pressure will cause a decrease in the braking of the associated wheels hence permitting the wheels to spin up or to regain speed.

In operation brake pressure will be increased until a skid condition occurs; this condition will be sensed as previously described and control module 26 will transmit an output control signal to actuate the solenoid 48 whereby the piston 46 will be moved out of the cylinder 62 resulting in a decrease in the brake pressure. Subsequently the vehicle wheel will have spun up or regained speed whereby the output signal from the module 26 is terminated whereby the initial actuation of the modulating valve 24 by means of the solenoid 48 is discontinued. Note that the initial brake pressure was above the ideal pressure and upon actuation of the modulating valve 24 the brake pressure dropped to a point below the ideal pressure. With the brake pressure above or below the ideal the maximum coefficient of friction for breaking is not realized. It is a feature of the present invention that the modulating valve 24 is constructed to return the fluid pressure quickly to a point which is proximate to the ideal pressure and then to provide for a gradual increase of the fluid pressure curve whereby nearly ideal brake pressure will be provided; this is accomplished by the construction to be described.

The piston 46 is freely sliding within the support bearing or bushing 66 and is actuated by the diaphragm assembly 42 located within the vacuum chamber housing 40. The assembly 42 includes a flexible diaphragm member 112 which has an annular outer bead 114 which is sealingly clamped between a flange on the chamber section 116 and a flange on a cap section 118. The sections 116 and 118 define the vacuum chamber housing 40. A generally cup-shaped power or diaphragm plate 120 is located in engagement with the diaphragm member 112, with the diaphragm member 112 being flexible and taking the shape of the power plate 120. The diaphragm assembly 42 further includes a flanged cap 122 which is located with a flange portion 124 engaging one side of a dished central portion 125 of the power plate 120 and is staked thereto at points 127. The diaphragm assembly 42 divides the vacuum chamber housing 40 into the section 50 on one side and section 54 on the other side.

A coil spring 128 has one end in engagement with a spring retainer 120 which engages the cap section 118. A plurality of hooks 132 are circumferentially spaced on plate 120 and receive the opposite end of spring 128. A plurality of fingers on retainer 130, upon disassembly of cap section 118 from chamber section 116, will engage a washer 134 which is secured to the end of cap 122 thereby restraining spring 128. Spring 128 is precompressed to bias the power plate 120 to its extreme inner position in the vacuum chamber section 50. The cap 122 has a cavity 136 which terminates in a hemispherically shaped portion 137 which receives the rounded end 139 of the protruding end of the hydraulic piston 46. Except for the engagement of end 139 in portion 137 the protruding end of piston 46 is in clearance relation with cavity 136; this engagement provides support for cap 133 while permitting some rocking for alignment purposes; note that since cap 122 is connected to power plate 120 via dished portion 125 the piston 46 at its rounded end 139 provides pivotal support for the diaphragm assembly 42. In the deactuated condition of valve 24, the spring 128 maintains the power plate 120 and hence the diaphragm assembly 42 and diaphragm 112 at their innermost positions in section 50 of the vacuum chamber housing 40; at this innermost position, the hydraulic piston 46 by virtue of engagement with the cap 122 is held in engagement against the shoulder 86 of the relief cylinder 62. The bias of the spring 128 is selected to provide a preload of sufficient magnitude to overcome the maximum force on the piston 46 as the result of the maximum fluid pressure in the cylinder 62 acting on the end of the piston 46.

Vacuum line 52 is connected in communication with the interior of vacuum chamber 54 at one side of diaphragm assembly 42. Upon actuation of the modulating valve 24, air pressure via the atmosphere is applied to the section 50 of the vacuum cylinder chamber housing 40. The area of the diaphragm assembly 42 is sufficient such that the air pressure will provide a force great enough to overcome the bias of spring 128 to move the diaphragm assembly 42 toward vacuum section 54 until the dished portion 126 engages the retainer 130. At this point the maximum relief of the brake pressure to the brakes is obtained.

The conduit assembly 56 is in fluid communication with the vacuum section 54 and is connected to vacuum and pressure port assemblies. The assembly 56 is connected to and in communication with a cavity 144 located in a port housing portion 145 which is a part of the chamber section 116. A housing assembly 161 holds the solenoid assembly 48 and is secured to the housing portion 145 of chamber section 116 with the solenoid 48 in line with cavity 144 and closes the rearward end thereof.

As can be seen from FIGURE 4, chamber 154 is normally blocked from chamber 144 by an atmospheric valve assembly 158. Chamber 144, however, is normally in communication with vacuum conduit 56 through a vacuum valve assembly 160. A passageway 162 connects chamber 144 with the side 50 via two separate paths. An opening 152 and conduit 153 (see FIGURE 4) communicate atmosphere to a chamber portion 154 of the chamber 144. A plate 159 (see FIGURE 3) has a cup shaped portion 163 mounted centrally to chamber section 116 and has a central opening 164 through which piston 46 and cap 122 extend. A throttle valve 165 is operable to seal the opening 164 to permit generally unrestricted communication between passage 152 and the one side 50, via a passage 166. Throttling occurs with valve 165 in its closed position such that communication between sections 50 and 54 is through a restricted opening (to be described). The throttle valve 165 includes an annular seal 167 which has sealing surfaces engaging cap 122 and the periphery around opening 164. A spring 168 acts against a plate on seal 167 and the power plate 120 to normally keep it in sealing engagement. Thus normally throttle valve 165 is closed. The plate 162 has a straight portion 169 which extends to close the forward end of chamber 154. The portion 169, however, is provided with a bleed hole 170 (the restricted opening noted above) which is normally in communication with vacuum via a path 171, passage 162, chamber 144 (valve 160), conduit 56, etc. In addition to bleed hole 170 a pair of pluralities of openings 172 communicate the side 50 with passage 162 via path 171. The openings 172, however, are normally closed by flexible umbrella, check valves 173. Thus normally both sides 50 and 54 are maintained at vacuum by bleed hole 170.

In the event of a skid control signal solenoid 48 will be activated moving atmosphere valve 158 and vacuum valve 160 to open and closed positions, respectively. The valves 158 and 160 are connected together and valve 160 has a seal portion 174 which in the closed position engages a sealing shoulder 175 whereby chamber 144 is sealed from vacuum conduit 56. At the same time valve 158 has a sealing portion 176 which is normally held in engagement with a sealing surface 177 via the bias of a coil spring 178, and which, upon actuation, is moved to a position whereby chambers 154 and 144 are in communication. Atmospheric air pressure then is transmitted from path 152 (see FIGURE 4), chamber 154, chamber 144, passage 162 to path 171. The umbrella check valves 173 are unseated and air pressure then applied to the side 50. Note that at the same time vacuum valve 160 blocks communication between atmosphere (via path 152) and vacuum (via conduit 56). A resilient seal and support 180 supports the atmosphere valve 158 (and hence the vacuum valve 160) while sealing the front end of chamber 154.

The solenoid assembly 48 includes a movable armature assembly 226 and includes a plunger 228 connected thereto and is actuated by energization of a plurality of windings 230 connected to conductor 32 from module 26. The armature assembly 226 includes spring 236 located at its outer end and engageable with the end of housing assembly 161. Upon energization of the solenoid 48, the armature 226 is drawn inwardly into a cavity 238 in solenoid 48 moving the plunger 228 inwardly. Plunger 228 engages vacuum valve 160 moving it to sealing shoulder 175 to close cylinder 144 from vacuum. At the same time the sealing portion 176 will be moved into engagement with the sealing surface 177. The air under pressure will move the diaphragm 112 and power plate 120 inwardly into the section 54. As this occurs a flange 182 on a cup member 183 fixed to the rearward end of cap 122 will engage the throttle valve 165 moving it out of engagement with the periphery of opening 164. In this condition the side 50 communicates with cavity 144 via path 166 and passage 162. As the wheels spin up and the signal from the module 26 is discontinued, the solenoid 48 will be deenergized permitting the return of plunger 228 back to its original position with the spring 178 moving the valves 158 and 160 to their original positions. When this occurs the piston 46 will be moved again into the cylinder 60 thereby reducing the available volume of cylinder 60 causing pressure to be reapplied to the brakes. This occurs rapidly since air is evacuated through the large opening 164. As the diaphragm assembly 42 approaches its end position, the throttle valve 165 (which had been moved with cup member 183) will close the path through the opening 164. At this time the air remaining in section 50 will be returned to vacuum through the bleed hole 170. The bleed hole 170 offers a substantial restriction to flow of air which results in a throttling effect or a slowing down of the return of the diaphragm assembly 42. This also slows down the return of the hydraulic piston 46. The throttling effect results in the brake pressure being reapplied at a reduced rate and will continue either until the diaphragm assembly 42 has reached its final position or until another output signal is received from the control module 26. Note that during return of assembly 42 the umbrella check valves 173 will close openings 172.

Depending upon the conditions of the road and the fluid requirement of the brake system (due to fade, etc.) the ideal required pressure may change and it is desirable that actual applied pressure follow. The bleed valve assembly 100 aids in this regard. As the piston 46 is moved back to its original position up deenergization of the solenoid 48, it engages the stem 102 of the bleed valve assembly 100 and passes to engagement with the stem 86 of the check valve 78. When this occurs fluid from the master cylinder 20 to the fluid line 18 will gradually be applied to the wheel brake cylinders 12 through the restricted path defined by the slight clearance between the base 104 and the stem 102. This will permit a gradual or controlled increase in the brake pressure and result in the actual pressure closely following the ideal pressure even when an increase in brake pressure or more fluid is required by the system. If the bleed valve 100 were not utilized and if additional pressure were required by the system before the occurrence of another skid condition, then when the piston 46 opened the check valve 76 a sharp or uncontrolled increase in pressure could occur resulting in a substantial departure from the ideal pressure requirement. Thereby use of the bleed valve assembly 100 in combination with check valve 76, the modulating valve 24 will provide an actual brake pressure closely approximating the ideal brake pressure.

Note that the throttle valve 165 is located concentrically whereby its actuation and positional location can be accurately controlled. Also, it is important that the throttle valve 165 be deactuated by movement of the diaphragm assembly 42 i.e. via cup 183 on cap 122. In the event of misfiring of the module 26 as by a transient and unwanted energization of solenoid 48 it is desirable that the valve 24 cycles as rapidly as possible. If misfiring occurs when the brakes have not been applied the diaphragm assembly 42 will move while the piston 46 will remain stationary. If the throttle valve 165 were deactuated by piston 46 under the above misfire conditions the valve 165 could remain actuated (closed) whereby the entire return cycle could be substantially slowed. During this period any slight brake actuation would move piston 46 resulting in closing off of further brake pressure and generally preventing braking. By making the deactuation of throttle valve 165 connected with movement of diaphragm assembly 42 the deactuation of valve 165 is assured and rapid cycling of valve 24 assured.

As previously noted the diaphragm assembly 42 is supported at one point by the engagement of the socket 137 in cap 122 and end 139 of piston 46. In addition a plastic bearing 250 supported in the end of the cap 122 and axially held thereby cap 183 engages the piston 46 and also acts as a guide. Thus as the assembly 42 is reciprocated it is supported and guided whereby its movement is accurately controlled i.e. assembly 42 prevented from being cocked, etc. This is important since the diaphragm assembly 42 actuated the throttle valve 165 and also actuates a switch SW. Switch SW is used in conjunction with time delay circuitry to provide a warning in the event of undue delay of the diaphragm assembly 42 in cycling (see copending application of Fielek et al., filed June 19, 1967, Ser. No. 641,001, the disclosure of which is incorporated herein by reference). By properly controlling the movement of diaphragm assembly 42, i.e. via socket 137 and bearing 250 cocking of the assembly 42 will be prevented and its movement accurately controlled whereby actuation of switch SW will be accurately controlled and only proper signals received therefrom.

Note that the interior of solenoid 48 is connected to vacuum conduit 56 thus providing for continuous air flow through the solenoid 48 whereby it will be kept dry i.e. condensation removed by flowing air.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A modulating valve for a skid control system for at least one wheel of a wheeled vehicle having brakes actuable from a source of fluid pressure comprising: a relief cylinder, passage means connecting said brief cylinder to the brakes, a piston slidably located in said relief cylinder and having a deactuated position for defining a first volume in said relief cylinder and an actuated position for defining a larger volume in said relief cylinder whereby the large volume can reduce fluid pressure at the brakes, a pneumatically operated diaphragm assembly operatively connected with said piston and having a deactuated position for holding said piston at its deactuated position and an actuated position permitting movement of said piston to the actuated position, valve means operative in response to a skid control signal for actuating and deactuating said diaphragm assembly, said diaphragm assembly being radially supported on said piston and including support means for supporting said diaphragm assembly on said piston at a pair of spaced points with one of said points providing pivotal support.

2. The valve of claim 1 including a throttling valve located concentrically with said piston, said throttling valve actuable for permitting air flow between opposite sides of said diaphragm assembly at a preselected restricted rate.

3. The valve of claim 2 with said valve means comprising a vacuum valve, an atmosphere valve, a fluid path communicable with one side of said diaphragm assembly, said vacuum and atmosphere valves having actuated and deactuated positions, and means operatively connected with said vacuum and atmosphere valves for communicating vacuum with said fluid path in the deactuated position and atmosphere to said fluid path in the actuated position.

4. The valve of claim 3 with said vacuum and atmosphere valves being connected together.

5. The valve of claim 3 with said valve means including check valve means connected between said fluid path and said one side of said diaphragm assembly for providing a substantially open path for atmospheric air into said one side and a closed path for evacuation of air from said one side.

6. The valve of claim 5 with said check valve means comprising a flexible umbrella type seal and a plurality of openings.

7. The valve of claim 3 with said throttling valve being normally closed and being opened in response to movement of said diaphragm assembly to its actuated position and defining a generally unrestricted path when opened for communicating with said fluid path.

8. The valve of claim 1 with said diaphragm assembly including a cap having a socket and said piston having an end pivotally supported in said socket for pivotal movement.

9. The valve of claim 8 with said cap having a bearing supported thereon at the other of said points and with said piston being guidably supported by said bearing.

10. The valve of claim 9 with said throttling valve being normally closed and being opened in response to movement of said diaphragm assembly to its actuated position and defining a generally unrestricted path when opened for communicating with said fluid path.

11. The valve of claim 10 with said throttling valve being supported on said cap.

12. A modulating valve for a skid control system for at least one wheel of a wheeled vehicle having brakes actuable from a source of fluid pressure comprising: a relief cylinder, passage means connecting said relief cylinder to the brakes, a piston slidably located in said relief cylinder and having a deactuated position for defining a first volume in said relief cylinder and an actuated position for defining a larger volume in said relief cylinder whereby the larger volume can reduce fluid pressure at the brakes, a pneumatically operated diaphragm assembly operatively connected with said piston and having a deactuated position for holding said piston at its deactuated position and an actuated position permitting movement of said piston to the acuated position, valve means operative in response to a skid control signal for actuating and deactuating said diaphragm assembly, a throttling valve located concentrically with said piston, said throttling valve actuable for permitting air flow between opposite sides of said diaphragm assembly at a preselected restricted rate.

13. The valve of claim 12 with said throttling valve being normally closed and being opened in response to movement of said diaphragm assembly to its actuated position and defining a generally unrestricted path when opened for communicating with said fluid path.

14. The valve of claim 13 with said diaphragm assembly including a cap having a socket and said piston having an end supported in said socket, and means on said cap for moving said throttling valve to its open position.

15. The valve of claim 14 with said throttling valve being supported on said cap.

References Cited

UNITED STATES PATENTS

| 3,306,677 | 2/1967 | Dewar et al. | 303—21 |
| 3,152,516 | 10/1964 | Allan | 92—113 X |
| 3,223,459 | 12/1965 | Packer | 303—21 |
| 3,325,226 | 6/1967 | Perrino | 303—21 |

FOREIGN PATENTS 975,252 11/1964 Great Britain.

MILTON BUCHLER, Primary Examiner

JOHN J. McLAUGHLIN, Jr., Assistant Examiner

U.S. Cl. X.R.

91—443; 92—113; 303—6

PO-1050
(5/69)

UNITED STATES PATENT OFFICE
CERTIFICATE OF CORRECTION

Patent No. 3,486,800          Dated December 30, 1969

Inventor(s) David T. Ayers, Jr.

It is certified that error appears in the above-identified patent and that said Letters Patent are hereby corrected as shown below:

Column 1, line 53, delete "arows" and substitute therefor --arrows--.
Column 2, line 67, delete "decrease" and substitute therefor --decreases--
Column 4, line 17, delete "6" and substitute therefor --67--.
Column 8, line 9, delete "requirement" and substitute therefor --requireme
Column 8, line 13, delete "up" and substitute therefor --upon--
Column 8, line 63 delete "actuated" and substitute therefor --actuates--.
Column 9, line 15, delete "brief" and substitute therefor --relief--.
Column 9, line 20, delete "large" and substitute therefor --larger--.

SIGNED AND
SEALED
JUN 16 1970

(SEAL)
Attest:

Edward M. Fletcher, Jr.
Attesting Officer

WILLIAM E. SCHUYLER, JR
Commissioner of Patents